US011277015B2

(12) United States Patent
Card et al.

(10) Patent No.: US 11,277,015 B2
(45) Date of Patent: Mar. 15, 2022

(54) USB TYPE-C CONNECTOR WITH SHORTED DIFFERENTIAL DATA CONTACTS

(71) Applicant: Fairchild Semiconductor Corporation, Sunnyvale, CA (US)

(72) Inventors: Robert A. Card, Scarborough, ME (US); James A. Meacham, II, Gorham, ME (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 338 days.

(21) Appl. No.: 15/387,832

(22) Filed: Dec. 22, 2016

(65) Prior Publication Data

US 2017/0194803 A1 Jul. 6, 2017

Related U.S. Application Data

(60) Provisional application No. 62/274,863, filed on Jan. 5, 2016.

(51) Int. Cl.
| | |
|---|---|
| *H02J 7/00* | (2006.01) |
| *H01R 24/20* | (2011.01) |
| *H01R 24/60* | (2011.01) |
| *H01R 24/28* | (2011.01) |
| *H01R 107/00* | (2006.01) |

(52) U.S. Cl.
CPC ............ *H02J 7/0042* (2013.01); *H01R 24/20* (2013.01); *H01R 24/60* (2013.01); *H02J 7/00* (2013.01); *H01R 24/28* (2013.01); *H01R 2107/00* (2013.01)

(58) Field of Classification Search
CPC .................. H02J 7/0052; H02J 7/0042; H02J 2007/0062; H02J 7/00; H01R 24/60; H01R 24/20; H01R 24/28; H01R 13/6658; H01R 2107/00
USPC ......................................................... 320/107
See application file for complete search history.

(56) References Cited

U.S. PATENT DOCUMENTS

| | | | | |
|---|---|---|---|---|
| 6,290,532 B1* | 9/2001 | Vermeersch | ........... | H05K 3/301 439/460 |
| 2004/0023557 A1* | 2/2004 | Sercu | .................. | H01R 13/6589 439/76.1 |
| 2008/0201583 A1* | 8/2008 | Fujiwara | .................. | G06F 1/266 713/300 |
| 2011/0100694 A1* | 5/2011 | Regnier | ............. | H01R 13/6658 174/260 |
| 2013/0088188 A1* | 4/2013 | Romanenko | .......... | H02J 7/0052 320/107 |
| 2015/0346790 A1* | 12/2015 | Talmola | .................. | G06F 1/266 710/104 |
| 2017/0005424 A1* | 1/2017 | Lee | ...................... | H01R 12/775 |

(Continued)

*Primary Examiner* — Richard Isla
*Assistant Examiner* — Manuel Hernandez
(74) *Attorney, Agent, or Firm* — Brake Hughes Bellermann LLP

(57) ABSTRACT

Techniques for charging an electronic device using a Universal Serial Bus (USB) cable and connector are provided. In an example, an apparatus can include a charger, a USB cable coupled to the charger at a first end of the cable, a paddle card for a USB connector coupled to the cable at a second end of the cable, the paddle card including differential data contacts, and wherein the differential data contacts of the paddle card are shorted together at the paddle card.

8 Claims, 4 Drawing Sheets

(56) References Cited

U.S. PATENT DOCUMENTS

2017/0062991 A1\* 3/2017 Lee .................. H05K 1/025
2017/0293335 A1\* 10/2017 Dunstan ............ G06F 1/266

\* cited by examiner

| ITEM | $R_{CABLE}$ | MAX. LIMIT | CABLE LENGTH | CURRENT | IR DROP | CABLE EFFICIENCY |
|---|---|---|---|---|---|---|
| EXISTING SOLUTION | VBUS | 500mV | 1 METER | 6A | 0.381V | ~91.43% |
| | GND | 250mV | 1 METER | 6A | 0.133V | |
| NEW SOLUTION | VBUS | 500mV | 1 METER | 6A | 0.190V | ~94.62% |
| | GND | 250mV | 1 METER | 6A | 0.133V | |

*FIG. 3*

USB TYPE-C CONNECTOR WITH SHORTED DIFFERENTIAL DATA CONTACTS

PRIORITY AND RELATED APPLICATIONS

This application claims the benefit of priority to U.S. Provisional Patent Application No. 62/274,863, entitled, "USB TYPE-C CONNECTOR FOR IMPROVED CHARGE EFFICIENCY," filed Jan. 5, 2016, which is hereby incorporated by reference herein in its entirety.

TECHNICAL FIELD

This document relates generally to charging electronic devices and more particularly to high rate charging using a USB cable and connector.

OVERVIEW

Techniques for charging an electronic device using a Universal Serial Bus (USB) cable and connector are provided. In an example, an apparatus can include a charger, a USB cable coupled to the charger at a first end of the cable, a paddle card for a USB connector coupled to the cable at a second end of the cable, the paddle card including differential data contacts, and wherein the differential data contacts of the paddle card are shorted together at the paddle card.

This overview is intended to provide a general overview of subject matter of the present patent application. It is not intended to provide an exclusive or exhaustive explanation of the invention. The detailed description is included to provide further information about the present patent application.

BACKGROUND

Time spent charging an electronic device such as a cell phone, smart phone, personal digital assistant, personal media player, etc. can often represent a limitation to the functional use of the device. A technique that can charge a device faster can provide multiple benefits to a device manufacturer as well as a user of such a device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates generally a comparison of charging efficiency between a charger having a conventional charger cable and conventional USB type-C connector and a charger having a conventional charger cable and a paddle board according to the present subject matter.

DETAILED DESCRIPTION

Universal Serial Bus (USB) Type-C connectors are a relatively new, tiny physical connector. The connector can support various USB standards like the new USB 3.1 and USB Power Delivery (PD). Unlike current USB cables that typically combine USB Type-A and USB Type-B connectors, the small size and reversible plug-in capability of the Type-C connector, along with powerful power delivery capability make the USB type-C connector attractive for not only small electronics such as mobile phones and accessories but also for larger devices including laptops, for example. In addition, a USB Type-C port can support a variety of different protocols using alternate modes which can allow for adapters that can output HDMI, VGA DisplayPort, or other types of connections from a single USB type-C port. Thus, the mess of different sized ports now found on personal computers and laptops can be streamlined with one or more USB Type-C ports.

Figure 1A:
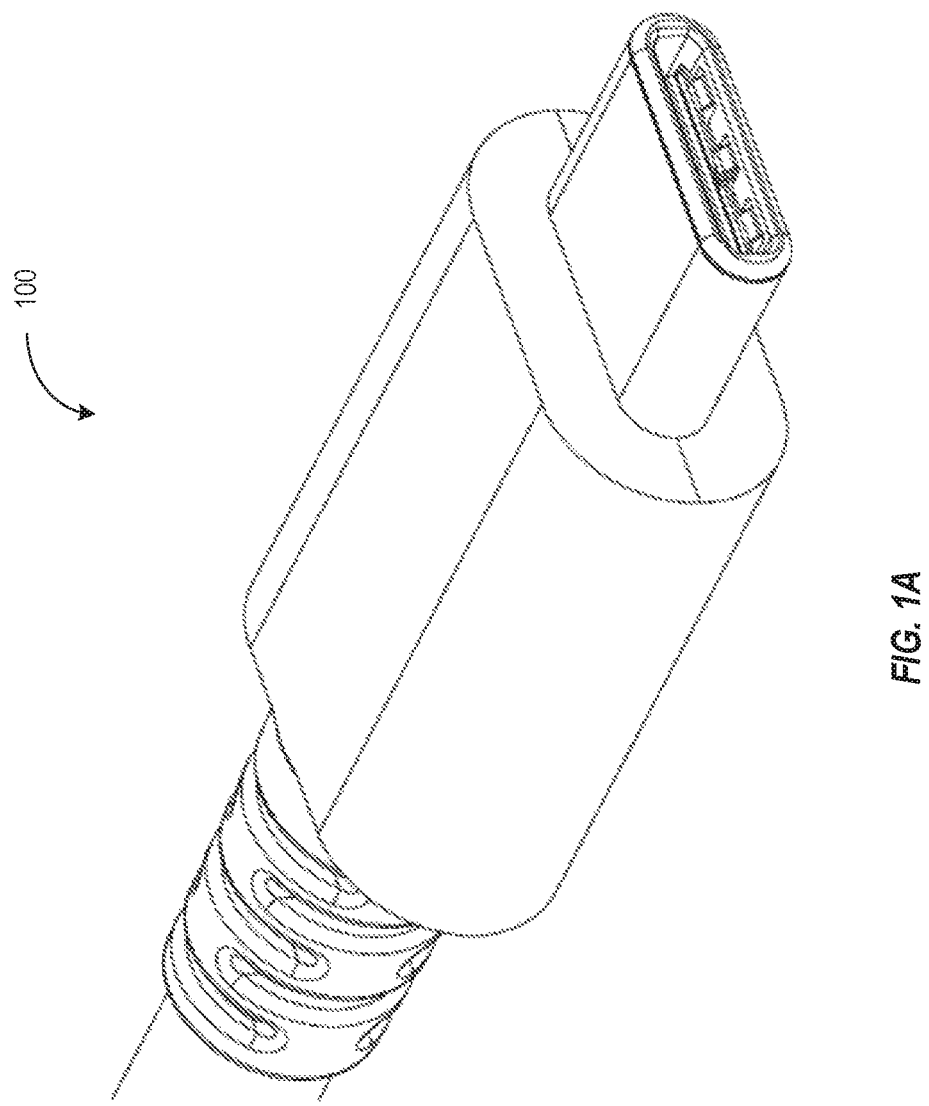
FIGS. 1A and 1B illustrate generally a USB connector and cable for a travel charging adapter.
Figure 1B:
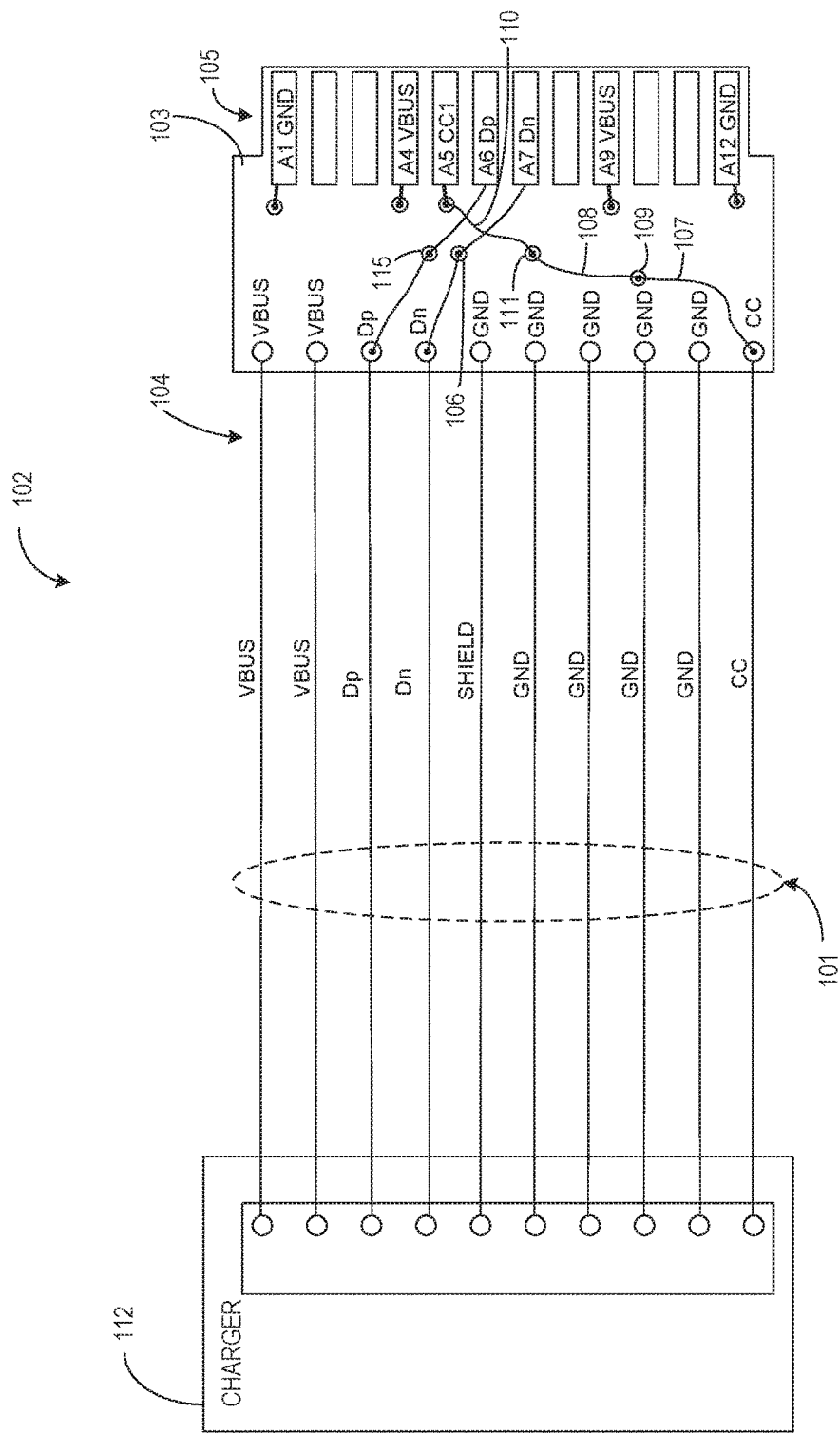

FIGS. 1A and 1B illustrate generally a USB connector 100 and cable 101 for a travel charging adapter 102 including charger electronics 112. FIG. 1A illustrates generally the physical connector 100. FIG. 1B illustrates a block diagram of the conductors of the cable 101 and the paddle card 103 of the physical connector 100 that can be coupled to a mobile device such as a mobile phone, smartphone, tablet, personal digital assistant, personal entertainment device, etc. The cable 101 can include two bus voltage (VBUS) conductors, two differential data (Dp, Dn) conductors, five ground (GND) conductors including a shield (Shield) conductor, and a configuration channel (CC) conductor. In certain configurations, a USB Type-C cable can include additional twisted differential conductor pairs for higher speed communications. The paddle card 103 can include traces to connect the cable terminations 104 with the connector contacts 105. The illustrated paddle card 103 includes several intermediate vias. Each of the differential data lines (Dp, Dn) use a via 115, 106 to transition the traces coupled to the cable terminations 104 from the bottom of the paddle card 103 to the top of the paddle card 103 where each is coupled to a connector contact (A6, A7) 105. The CC cable termination couples to a trace 107 on the bottom of the card, transitions to a trace 108 on the top of the card at a first via 109, transitions to a trace 110 on the bottom of the card at a second via 111, and couples to a connector contact (A5) 105.

The inventors have recognized that for travel adapters and other chargers the conventional USB cables and initial connector configurations for USB type-C connectors are not optimized for efficient charging. In addition, the inventors have recognized a system for a charger compatible with high capacity-rate charging capability such as under USB-PD using a USB type-C connector that can also be backwards compatible with USB Battery Charging Revision 1.2.

Figure 2:
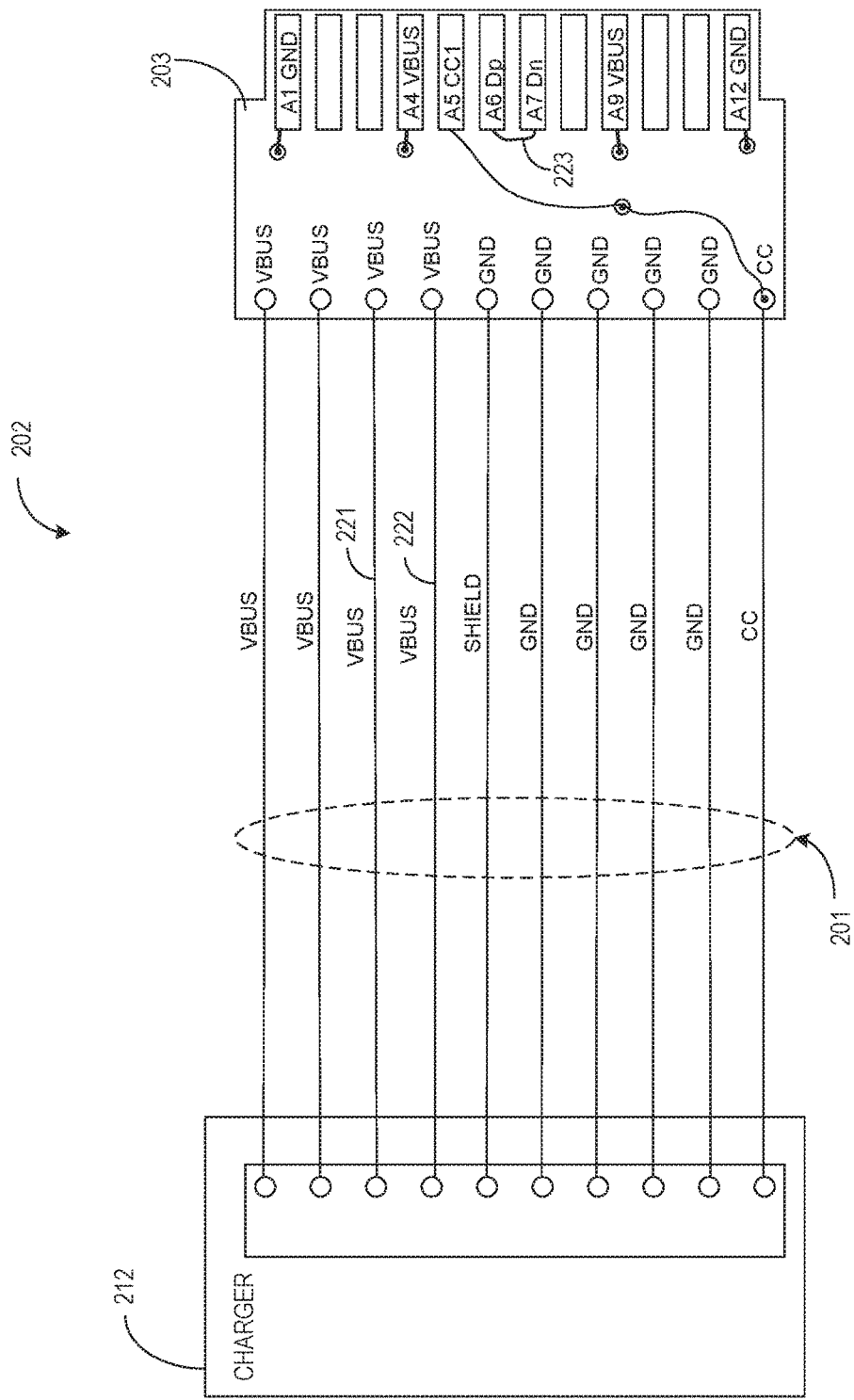
FIG. 2 illustrates generally an example of a captive cable charger with a USB type-C connector.

FIG. 2 illustrates generally a block diagram of an example of a captive cable charger 202 with a USB type-C connector that can be coupled to a mobile device such as a mobile phone, smartphone, tablet, personal digital assistant, personal entertainment device, etc. In certain examples, the charger 202 can include the charger electronics 212 including output terminals for the charger cable 201, the charger cable 201, and a paddle card 203 of the USB type-C connector. The cable 201 can include bus voltage conductors (VBUS), ground conductors (GND) and a CC conductor (CC). In certain examples, the cable 201 does not include differential conductors for data, such as the data+(Dp) and data−(Dn) associated with USB 2.0, but instead uses those conductors as two additional bus voltage conductors 221, 222. The additional bus voltage conductors 221, 222 can significantly increase efficiency of the charger 202 over chargers that include the USB 2.0-type differential data conductors (Dp, Dn). In addition, the elimination of cable terminations and routing traces for the USB 2.0-type data differential conductors (Dp, Dn) allows the paddle card 203 for the USB type-C connector to be less complex. In certain examples, the differential data contacts (A6, A7) of the USB type-C connector for the differential data conductors (Dp, Dn) can be shorted together using a short trace 223 or short conductor. Shorting the differential data contacts (A6, A7) can allow the captive cable charger 202 to be backwards compatible with USB Battery Charging Revision 1.2. As used herein, a captive cable charger is a charger that has a cable that is integrated or soldered to the charger electronics as opposed to a cable that can be easily be connected to and easily removed from the charger electronics.

FIG. 3 illustrates generally a comparison of charging efficiency between a charger having a conventional charger cable and conventional USB type-C connector and a charger having a conventional charger cable and a paddle board according to the present subject matter. The efficiency is calculated by dividing the power output at the connector by the power input at the charger. The power input (Pin) can be given by, $$P\text{in} = V\text{in} \times I, \quad (\text{Eq. 1})$$

where Vin is the voltage at the charger and I is the charging current. The power output (Pout) at the connector can be given by, $$P\text{out} = P\text{in} - P\text{loss}, \quad (\text{Eq. 2})$$

where Ploss is the power loss of the cable. The power loss of the cable (Ploss) can be given by, $$P\text{loss} = I \times IR\text{drop}, \quad (\text{Eq. 3})$$

where IRdrop is the voltage drop associated with the cable including the voltage drop associated with the bus voltage conductors and the voltage drop associated with the ground conductors. The illustrated comparison includes measured IRdrops for each of the different types (VBUS, GND) of conductors. As the comparison illustrates, adding additional bus voltage conductors, for example by repurposing the data conductors (Dp, Dn) of a conventional USB cable, the IRdrop associated with the bus voltage conductors can be lowered and thus increase the charging efficiency of the charger by about 3.5% or more in high capacity-rate charging modes.

In addition to the added efficiency, a charger cable and connector according to the present subject matter does not cost any more than a conventional cable and connector assembly and can be less expensive because of the simplified paddle board of the USB c-type connector. Also, the shorting of the data terminations at the USB type-C connector can allow the charger system to be backwards compatible with USB Battery Charging Revision 1.2.

ADDITIONAL NOTES AND EXAMPLES

Example 1 is an apparatus comprising: a charger; a Universal Serial Bus (USB) cable coupled to the charger at a first end of the cable; a paddle card for a USB connector coupled to the cable at a second end of the cable, the paddle card including differential data contacts; and wherein the differential data contacts of the paddle card are shorted together at the paddle card.

In Example 2, the differential data contacts of the paddle card of Example 1 optionally are coupled to a bus voltage conductor of the charger.

In Example 3, the subject matter of any one or more of Examples 1-2 optionally include wherein the cable includes a configuration conductor coupled between the charger and the paddle card.

In Example 4, the subject matter of any one or more of Examples 1-3 optionally include wherein the cable does not include differential data conductors coupled between the differential data contacts of the paddle card and the charger.

In Example 5, the subject matter of any one or more of Examples 1-4 optionally include wherein the paddle card is configured for a USB type-C connector.

In Example 6, the subject matter of any one or more of Examples 1-5 optionally include wherein the USB cable is captive to the charger.

Example 7 is an system comprising: an electronic device having a battery and a first portion of a USB connector; a charger configured to provide charge energy to the batter via the USB connector; a Universal Serial Bus (USB) cable coupled to the charger at a first end of the cable; a paddle card for a second portion of the USB connector, the paddle card coupled to the cable at a second end of the cable, the paddle card including differential data contacts; and wherein the differential data contacts of the paddle card are shorted together at the paddle card.

In Example 8, the differential data contacts of the paddle card of any one or more of Examples 1-7 optionally are coupled to a bus voltage conductor of the charger.

In Example 9, the subject matter of any one or more of Examples 7-8 optionally include wherein the cable includes a configuration conductor coupled between the charger and the paddle card.

In Example 10, the subject matter of any one or more of Examples 7-9 optionally include wherein the cable does not include differential data conductors coupled between the differential data contacts of the paddle card and the charger.

In Example 11, the subject matter of any one or more of Examples 7-10 optionally include wherein the paddle card is configured for a USB type-C connector.

In Example 12, the subject matter of any one or more of Examples 7-11 optionally include wherein the USB cable is captive to the charger.

Example 13 is a method comprising: charging a battery of an electronic device using a Universal Serial Bus (USB) connector of the electronic device and a USB-compatible cable coupled to the USB connector, wherein the charging includes conducting charge energy over differential data conductors of the USB-compatible cable.

In Example 14, the subject matter of Example 13 optionally includes wherein the USB connector is a USB type-C connector.

In Example 15, the subject matter of Example 14 optionally includes wherein the charging includes passing charge energy from a bus voltage conductor of the cable to the electronic device and passing charge current from the differential data conductors to the electronic device using a short-type connection at a paddle of the USB type-C connector.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
   a charger; and
   a Universal Serial Bus (USB) cable coupled to the charger at a first end of the USB cable, the USB cable comprising:
      a configuration channel conductor;
      a differential data conductor; and
      a paddle card at a second end of the USB cable, the paddle card including:
         a cable termination for the configuration channel conductor connecting to a trace on a bottom of the paddle card, transitioning to a trace on a top of the paddle card at a first via through the paddle card, transitioning to a trace on the bottom of the paddle card at a second via through the paddle card and coupling to a connector contact; and
         a cable termination for the differential data conductor connecting to a trace on a bottom of the paddle card, transitioning to a trace on the top of the paddle card at a third via through the paddle card, and coupling to a connector contact.

2. The apparatus of claim 1, wherein the paddle card is configured for a USB type-C connector.

3. The apparatus of claim 1, wherein the USB cable is captive to the charger.

4. A system comprising:
   an electronic device having a battery and a first portion of a USB connector;
   a charger configured to provide charge energy to the battery via the USB connector; and
   a Universal Serial Bus (USB) cable coupled to the charger at a first end of the USB cable, the USB cable including:
      a configuration channel conductor;
      a differential data conductor; and
      a paddle card including:
      a cable termination of the configuration channel conductor connecting to a trace on a bottom of the paddle card transitioning to a trace on a top of the paddle card at a first via through the paddle card, transitioning to a trace on the bottom of the paddle card at a second via through the paddle card and coupling to a connector contact; and
      a cable termination for the differential data conductor connecting to a trace on a bottom of the paddle card, transitioning to a trace on the top of the paddle card at a third via through the paddle card, and coupling to a connector contact.

5. The system of claim 4, wherein the paddle card is configured for a USB type-C connector.

6. The system of claim 4, wherein the USB cable is captive to the charger.

7. A method comprising:
   charging a battery of an electronic device using a Universal Serial Bus (USB) connector of the electronic device and a USB-compatible cable coupled to the USB connector, wherein the charging includes conducting charge energy over conductors of the USB-compatible cable, the conductors including:

a configuration channel conductor and a differential data conductor coupled to a paddle card, the paddle card including:

a cable termination for the configuration channel conductor connecting to a trace on a bottom of the paddle card transitioning to a trace on a top of the paddle card at a first via through the paddle card, transitioning to a trace on the bottom of the paddle card at a second via through the paddle card and coupling to a connector contact; and a cable termination for the differential data conductor connecting to a trace on a bottom of the paddle card, transitioning to a trace on the top of the paddle card at a third via through the paddle card, and coupling to a connector contact.

8. The method of claim 7, wherein the USB connector is a USB type-C connector.

\* \* \* \* \*